May 27, 1941.  A. S. T. LAGAARD  2,243,709
DOUGHNUT MACHINE
Filed Feb. 1, 1940  2 Sheets-Sheet 1

Inventor
Alexander S. T. Lagaard
By Caswell & Lagaard
Attorneys

May 27, 1941.  A. S. T. LAGAARD  2,243,709
DOUGHNUT MACHINE
Filed Feb. 1, 1940  2 Sheets-Sheet 2
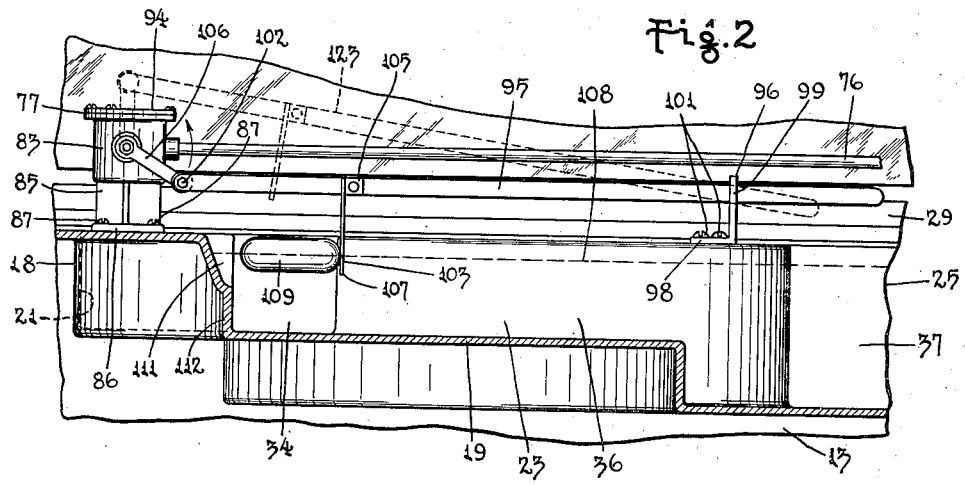
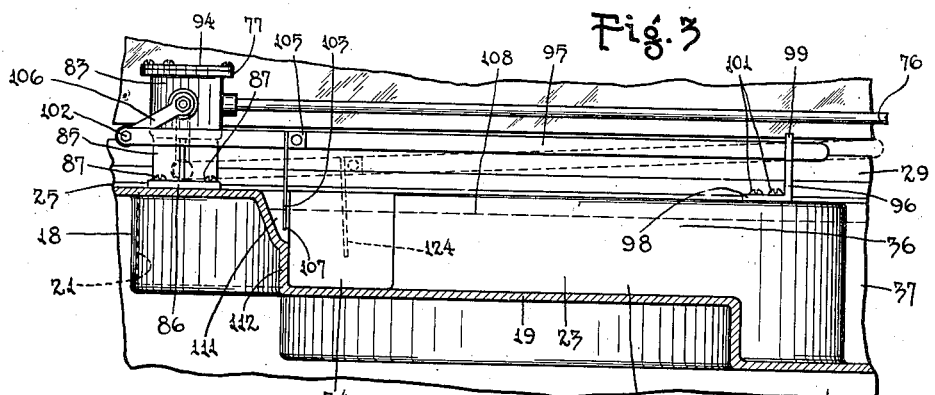
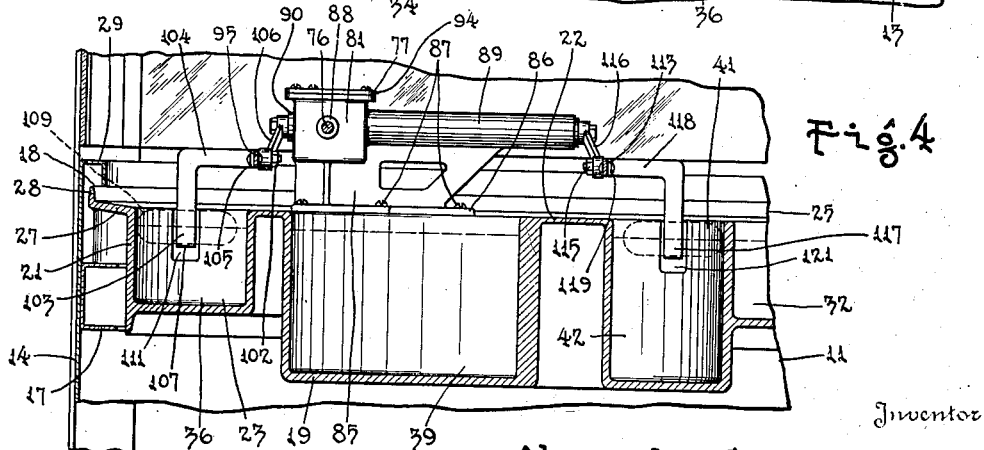
Inventor
Alexander S. T. Lagaard Patented May 27, 1941

2,243,709

UNITED STATES PATENT OFFICE 2,243,709

DOUGHNUT MACHINE

Alexander S. T. Lagaard, Minneapolis, Minn., assignor to Dough-King, Inc., Minneapolis, Minn., a corporation of Minnesota Application February 1, 1940, Serial No. 316,776

8 Claims. (Cl. 53—7)

My invention relates to doughnut machines and particularly to doughnut machines in which the doughnuts are progressed along a channel in a kettle throughout a circuitous course by means of the flow of the cooking liquid.

An object of the invention resides in providing a control device for a doughnut machine of such character by means of which the rate of travel of the doughnuts along the channel may be regulated.

Another object of the invention resides in providing a control device for a doughnut machine adapted to be operated by a mechanism disposed substantially entirely above the cooking liquid to prevent submerging of the parts in the cooking liquid and to give ready access thereto.

Another object of the invention resides in providing a control device having an engaging member adapted to engage the doughnuts from behind and to positively move the doughnuts, one at a time, along the channel.

Another object of the invention resides in providing a doughnut machine having a channel formed with a sharp corner and in arranging the control device at the said corner.

A still further object of the invention resides in constructing the control device in the form of a rake utilizing an engaging member adapted to engage the doughnuts from behind and to positively move the same along the channel in the manner of the use of a rake.

Other objects of the invention reside in the novel combination and arrangement of parts and in the details of construction hereinafter illustrated and/or described.

In the drawings:

Fig. 2 is a longitudinal elevational sectional view taken on line 2—2 of Fig. 1.

Fig. 3 is a view similar to Fig. 2 of a portion of the structure shown therein and drawn to a somewhat greater scale.

Fig. 4 is a cross sectional view taken on line 4—4 of Fig. 1.

Figure 1:
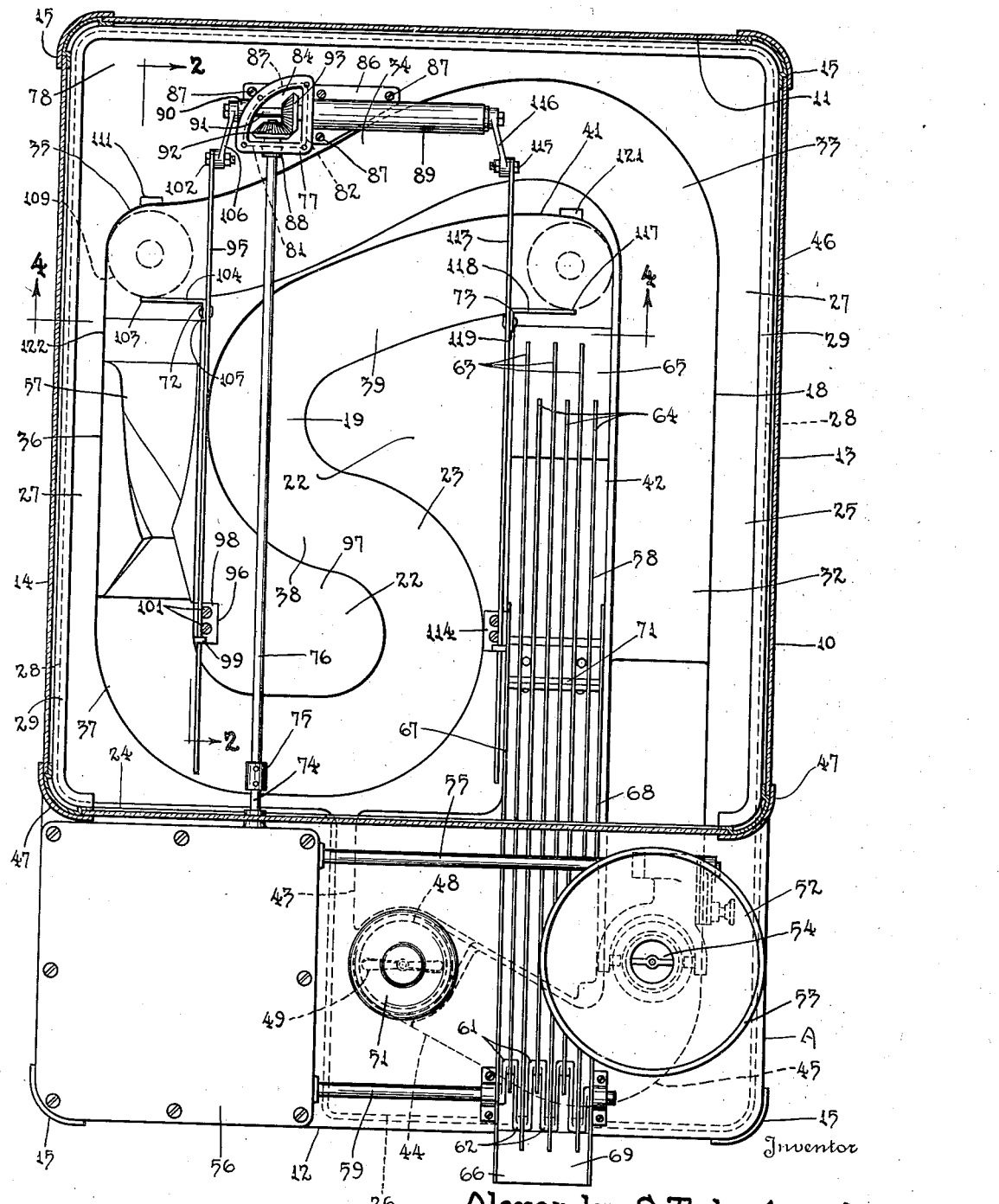
Fig. 1 is a plan sectional view of a doughnut machine illustrating an embodiment of my invention.

In the drawings I have shown a doughnut machine A which consists of a case 10 constructed with end walls 11 and 12, and side walls 13 and 14 connected therewith. The case includes uprights 15 situated at the outer corners of the same and which extend throughout the height of the case and to which the various walls are attached. Secured to the various uprights 15 are angle frame members 17 which stiffen the case and which serve as supports for the kettle of the invention.

Within the case 10 is disposed a cooking kettle 18 which is constructed with a bottom 19 and with vertical walls 21 extending upwardly therefrom. The vertical walls are connected at their upper ends with upper walls 22, and the various walls are so arranged as to form a channel 23 which extends throughout the major portion of the kettle and which provides a way along which the doughnuts may travel. The kettle 18 has one corner of the same removed, as designated at 24, leaving a main portion 25 of the width of the case 10 and of a length equal to about two-thirds of the length of the same. This construction provides an extension 26 to the kettle which extends up to the end wall 12. The kettle 18 is constructed with a ledge 27 extending about the margin of the same, which terminates in a lip 28 projecting upwardly from the extreme edge thereof. A guard 29 on the case 10 issues inwardly from the walls thereof and overlies the lip 28, thereby protecting the same and at the same time being spaced therefrom to retard transmission of heat from the kettle to the case. The kettle 18 is supported on the angle frame members 17.

The channel 23 is arranged to provide a straight run 32 which commences in close proximity to wall 12 and which follows along wall 13. The channel 23, at the end of run 32 makes a curve 33, which leads into a transverse run 34 extending along the wall 14. This latter run is in the nature of a reverse curve and forms a sharp angle or corner at 35 with another straight run 36. The run 36 follows closely along the wall 14. It will be noted in Fig. 1 that the corner 35 is disposed considerably inwardly of the wall 11 for a purpose to be presently more fully described. The run 36 is connected to a curved run 37 extending up to the end of the major portion 25 of the case at the corner 24 thereof. The run 37 is connected with an S-shaped run 38 extending generally longitudinally of the kettle and disposed adjacent the run 36 and extending in the opposite direction, as compared to the run 36. The S-shaped run 38 is connected with another transverse run 39 which follows along run 34. Run 39 makes a sharp angle 41 with another longitudinal run 42 disposed adjacent the run 32 and extending in the opposite direction therefrom. The run 42 discharges into a reservoir 43 which is merely an enlargement of said run. From this reservoir a short run 44 is provided which is connected by means of a curved run 45 with the beginning of the run 32. A portion of the reservoir 43, the run 44, the run 45, and the beginning of run 32 are all disposed in the extension 26 of the kettle 18. The major portion 25 of kettle 18 is enclosed by means of a hood 46. This hood utilizes the uprights 15 at the end wall 11 and two other uprights 47 which are attached to the case at the locality of the end of the portion 25 thereof. The construction of the hood not forming any particular feature of the invention has not been shown in detail, though it can readily be comprehended that any suitable construction may be used for the purpose.

In the reservoir 43 is provided a vertical tubular duct 48 which communicates at its lower end with the said reservoir. In this duct is provided an impeller or elevator 49 which is mounted on the armature shaft of a motor 51. The duct 48 communicates at its upper end with the run 44 of the channel 23, thus discharging the cooking liquid from the reservoir 43 and into the run 44 of the channel, from which it flows throughout the course of the channel and is returned into reservoir 43.

Situated at the beginning of the run 32 of channel 23 is a doughnut former 52. This doughnut former comprises a receptacle 53 for raw dough, and a suitable cutter 54 connected therewith. Such construction being well known in the art will not be described in detail in this application. The cutter 54 is periodically operated by means of the shaft 55 which is driven by a transmission, not shown in the drawings, but contained within a case 56 situated in the corner 24 of the kettle 18.

In the run 36 of the channel 23 of kettle 18 is arranged a twisted tubular turner 57. This turner inverts the doughnuts after the same have been cooked a predetermined length of time so that the said doughnuts may be cooked equally on both sides thereof. Such devices being well known in the art the turner 57 will not be described in detail in this application.

For removing the cooked doughnuts from the machine an ejector 58 is employed which is disposed in the run 42 of channel 23. This ejector comprises a shaft 59 which is constantly driven from the transmission within the housing 56. This shaft has mounted on it oppositely extending cranks 61 and 62. Sets of toothed blades 63 and 64 are mounted on the ends of said cranks and are adapted to be alternately raised and lowered as the shaft 59 rotates. The lower ends of these blades slide upon an inclined rest 65 which is mounted on the bottom 19 of receptacle 18 in the portion of the run 42 immediately following the corner 41 of the channel. It will readily be comprehended that, as the doughnuts reach the said blades, the doughnuts are elevated and progressed upwardly and outwardly of the cooking kettle 18. The ejector 58 is disposed within a trough 66 which is constructed with two side plates 67 and 68 and a bottom 69 at the discharge end thereof. This trough directs the doughnuts upon leaving the ejector outwardly of the machine.

For controlling the elevation of the cooking liquid in the channel 23 a dam 71 is used which extends across the run 42 of channel 23 at the locality of the beginning of the reservoir 43. The cooking liquid in flowing through the channel 23 passes over this dam, which serves as a weir and is maintained at a predetermined elevation thereby.

The invention proper comprises two control devices 72 and 73 which control the rate of travel of doughnuts to the turner 57 and the ejector 58. The control device 72 and the mechanism for operating the same will first be described in detail.

Issuing outwardly from the housing 56 is a shaft 74 which is intermittently driven in synchronism with the operation of the cutter 64, said shaft being given a complete revolution for each cycle of operations. This shaft may be driven by means of cams in a manner such as disclosed in my co-pending application for Letters Patent of the United States for Dougnut machine, Serial No. 302,945 filed November 6, 1939. Inasmuch as the mechanism for operating this shaft forms no particular feature of the instant invention the same has not been shown in the drawings and will not be described. Connected to the shaft 74 by means of a coupling 75 is a shaft extension 76. This shaft extension extends longitudinally of the kettle 18 and is journalled in a case 77 atttached to the portion 78 of the ledge 27 of said kettle which is situated outwardly of the run 34 of the channel 23. This case is open at the top and is constructed with walls 81, 82 and 83 connected together through a bottom 84. A leg 85 is attached to the bottom and is mounted on a base 86. Screws 87 extend through the base 86 and are threaded into the portion 78 of the ledge 27. By means of this construction the case 77 is held at an elevated position above the kettle 18. In the wall 81 of case 77 is formed a bearing 88 which journals the shaft 76. Issuing outwardly from the wall 82 of the case 77 is an elongated bearing 89 which journals a shaft 91. This shaft is further journalled in a bearing 92 formed in the wall 83 of said case and extends outwardly beyond the bearings of the case at both ends. Attached to the shaft extension 76 upon the inner end thereof is a bevel gear 92 which meshes with another bevel gear 93, mounted on the shaft 91. A cover 94 secured to the upper ends of the walls of the case 77 closes the open upper end thereof.

The control device 72 includes a longitudinally extending link 95. This link is slidably mounted for both swinging and reciprocating movement in a guide 96 secured to the portion 97 of the top 22 of kettle 18, situated between the runs 36, 37 and 38. This guide is in the nature of an angle having a base 98 and an upright 99 extending upwardly therefrom. The base 98 is secured to the portion 97 of top 23 by means of screws 101 which extend through the base 98 and are threaded into the said top. The link 95 is preferably rectangular in cross section and the upright 99 has a hole in it of such dimensions as to receive the link 95 and to maintain the said link in a vertical plane and yet permit of freely swinging and sliding of the link. The other end of the link 95 is pivotally connected by means of a bolt 102 to a crank arm 103 secured to the protruding end of the shaft 91. Mounted on the link 95, intermediate the ends thereof, is a blade 103 which is attached to an arm 104. This arm has a flange 105 overlying link 95 and secured thereto. The blade 103 is so situated that the same is disposed centrally within the run 36 of channel 23 and when the crank 106 is in the position shown in Fig. 2, the said blade is situated at a locality spaced from the end of the corner 35 of kettle 18 a distance sufficient to receive a doughnut therebetween and with the lowermost end 107 of said blade slightly below the level of the cooking liquid which is designated in Fig. 2 by the reference numeral 108. In Figs.

2 and 3 I have shown a doughnut which is indicated by the reference numeral 109 and which is held from movement by the blade 103. When the shaft 91 is rotated, crank 106 is moved in a counter-clockwise direction, as indicated in Fig. 2, and may occupy its opposite extreme position, as shown in Fig. 3. In such position the blade 103 is situated out of the path of travel of the doughnuts. To make this possible a niche 111 is formed in the portion 112 of the vertical walls 21 of kettle 18 at the corner 35 between the runs 34 and 36.

The control device 73 is constructed in a manner similar to the control device 72 and employs a link 113, similar to link 95, which is guided at one end for sliding and swinging movement in a guide 114. The link 113 is pivotally connected by means of a bolt 115 with a crank 116, similar to the crank 106 and attached to the other end of the shaft 91. Carried by the link 113 is a blade 117 which is formed on an arm 118. Arm 118 has a flange 119 which is attached to the link 113. Both the cranks 106 and 116 extend in the same direction so that the two links 95 and 113 are simultaneously reciprocated and the blades 103 and 117 moved in correspondence. The blade 117 operates in the corner 41 of the channel 23 in identically the same manner as the blade 103 and is adapted to be moved into and out of a niche 121 formed in the wall structure 21 of the kettle.

The operation of my improved doughnut machine is as follows: As the transmission within the housing 56 is operated the cutter 54 periodically removes dough from the dough contained within the receptacle 53 and discharges the dough formations into the cooking liquid within the run 32 of channel 23. The elevator or impeller 49 causes the cooking liquid to rise in the duct 48 and to travel along the run 23 of the kettle. The doughnuts so deposited in the cooking liquid are caused to travel along the kettle until one such doughnut, which is indicated at 109 in Figs. 1 and 2, engages the wall 122 of the kettle 18 which is situated at the corner 35 in the run 23 and which forms the outermost wall of the run 36. The doughnut 109, on reaching this position, travels between the portion 112 of the wall structure 21 of kettle 18 and the blade 103, which is normally in the position shown in Figs. 1 and 2. Here the doughnut comes to rest and is maintained in such position. In starting the machine the doughnuts are held back in advance of the position shown in Fig. 1 until enough doughnuts have collected in the machine to cause the same to cook the desired amount upon one side thereof. The doughnuts are then released and the foremost doughnut occupies the position of the doughnut 109 in the drawings. As the transmission within the housing 56 operates, the shaft 91 is rotated in a counter-clockwise direction, as shown in Figs. 2 and 3. As will be noted in Fig. 2 crank 106 is situated somewhat below its horizontal position and to the right. As rotation commences the link 95 is raised and likewise blade 103 is disengaged from the doughnut and raised above the same. As the shaft 91 continues to rotate the blade 103 travels upwardly above the doughnut 109 and rearwardly toward the niche 111. One of the intermediate positions of the blade 103 and the link 95 is shown in dotted lines at 123 in Fig. 2. As the crank 106 continues to move blade 103 is dropped into the niche 111 and in back of the doughnut 109. Continuation of the movement of the shaft 91 causes the blade 103 to travel beneath the surface 108 of the cooking liquid and to progress the doughnut 109 along the channel and away from the position previously occupied by the same. While the doughnut 109 is so travelling the succeeding doughnut, which has not been shown in the drawings, follows along and takes the place of the doughnut 109. The extreme position of the blade 103, when disposed in back of the doughnut 109, is shown in full lines in Fig. 3. An intermediate position of the blade 103, when progressing the doughnut, is indicated in dotted lines 124 in Fig. 3. When the blade 103 reaches the position shown in full lines in Fig. 2, rotation of the shaft 91 ceases and the control device has completed its cycle. The transmission within the case 56 is preferably constructed so that the progressing movement of the blade 103 is sufficiently slow to prevent injury to the doughnut and so that the relative movement of the blade is sufficiently rapid to prevent any appreciable shifting of the doughnuts before the blade is in position to engage the doughnut. It will become apparent that, while the blade 103 is progressing the doughnut 109 the said blade and the doughnut 109 prevent the adjacent doughnut from becoming wedged in between the said blade and the portion 122 of the wall structure 21 of the kettle 18. As the doughnuts are fed by the control device 72 to the turner 57 the said doughnuts are inverted and pass through the runs 37, 38 and 39 of the channel 23 of kettle 18 and are engaged by the control device 73 in the same manner as by the control device 72. In starting the machine the doughnuts are held back from the control device 73 until the desired number of doughnuts have accumulated in the run 39 of channel 23. The same are then released and the control device 73 operates in identically the same manner as the control device 72 to discharge the doughnuts, one at a time, to the ejector 58. By means of the ejector 58 the doughnuts are elevated out of the channel 23 and discharge out of the machine. As previously stated, the shaft 74 is driven in synchronism with the shaft 55. In this manner the feeding of the doughnuts to the turner 57 and the ejector 58 is in synchronism with the depositing of doughnuts by the cutter 54 into the channel 23. In this manner the machine operates continuously and positively.

The advantages of my invention are manifest. An extremely simple and practical construction is provided by means of which the number of doughnuts entering the turner or ejector of a doughnut machine can be controlled. By means of my improved construction only the tip end of the blades for arresting the travel of the doughnuts and progressing the same enter the cooking liquid. With my invention the operating mechanism for the blades is disposed entirely above the surface of the cooking liquid. In this manner there are no parts submerged in or operating within the cooking liquid or adapted to become coated with cooking liquid so that gumming of the mechanism of the control devices is completely prevented. With my invention the doughnuts are positively held from movement and when progression is desired are positively moved out of the original positions occupied thereby. In this manner the movement of doughnuts from their restrained positions to positions in which the same may be progressed by means of the flow of the cooking liquid is procured so that positive action results. With my invention a single operating shaft extending from the transmission of the invention may be utilized to simultaneously operate both of the control devices.

Changes in the specific form of my invention, as herein disclosed, may be made within the scope of what is claimed without departing from the spirit of my invention.

Having described my invention, what I claim as new and desire to protect by Letters Patent is:

1. In a doughnut machine in which the doughnuts are progressed through the flow of the cooking liquid along a way having a corner, an engaging member movable in a vertical plane in the run of said way leaving the corner, means for guiding said engaging member for movement from a position spaced from the remote wall of the run leading up to said corner upwardly and out of the cooking liquid to a position in proximity to said wall back into the cooking liquid and along the cooking liquid in said corner back to its original position.

2. In a doughnut machine in which the doughnuts are progressed through the flow of the cooking liquid along a way, an engaging member for arresting movement of the doughnuts along said way, means for guiding said engaging member for movement upwardly and out of the way to a position rearwardly of its original position and back through the cooking liquid to its original position, and a crank for moving said engaging member throughout its path of movement.

3. In a doughnut machine in which the doughnuts are progressed through the flow of the cooking liquid along a way, a link extending along said way, a guide for guiding one end of said link for swinging and reciprocating movement, a crank, means at the other end of said link for pivotally connecting the same to said crank, an engaging member carried by said link and movable therewith from a position in said way obstructing the travel of doughnuts upwardly and out of the cooking liquid and rearwardly to a position in back of a doughnut obstructed thereby and thence forwardly through the cooking liquid to its original position.

4. In a doughnut machine in which the doughnuts are progressed through the flow of the cooking liquid along a way, a link extending along said way, a guide for guiding one end of said link for swinging and reciprocating movement, a crank, means at the other end of said link for pivotally connecting the same to said crank, an engaging member carried by said link intermediate said pivot means and guide and movable therewith from a position in said way obstructing the travel of doughnuts upwardly and out of the cooking liquid and rearwardly to a position in back of a doughnut obstructed thereby and thence forwardly through the cooking liquid to its original position.

5. In a doughnut machine in which the doughnuts are progressed through the flow of the cooking liquid along a way having two corners spaced transversely of the way at corresponding localities situated longitudinally of the way, a transverse shaft, cranks connected to the ends of said shaft and extending in the same direction, two links extending along the two of the runs of said way leaving said corners, guides for guiding said links at their ends furthest from said corners for swinging and reciprocating movement, means for pivoting the other ends of said links to said cranks, and engaging members carried by said links and adapted to be moved within said corners by said cranks to control the progression of doughnuts along said way.

6. In a doughnut machine in which the doughnuts are progressed through the flow of the cooking liquid along a way, an engaging member in said way in the form of a rake adapted to progress the doughnuts along said way by a raking movement in which the engaging member is moved upwardly and outwardly of the cooking liquid to a rearward position, then lowered in the cooking liquid and moved forwardly within the cooking liquid to its original position to progress the doughnuts one at a time along the cooking liquid.

7. In a doughnut machine in which the doughnuts are progressed through the flow of the cooking liquid along a way, an engaging member for engagement with the doughnuts adapted at one position to arrest movement of the doughnuts along said way, means for guiding said engaging member for movement upwardly and out of the way to a position rearwardly of said denoted position and back through the cooking liquid in the direction of travel of the cooking liquid to said denoted position.

8. In a doughnut machine in which the doughnuts are progressed through the flow of the cooking liquid along a way, an engaging member extending in a vertical direction within the cooking liquid and adapted to be positioned in front of a doughnut, means for moving said engaging member out of the cooking liquid first in a direction opposite to the direction of travel of the doughnuts to a position rearwardly of the doughnut and then back into the cooking liquid and while within the cooking liquid in the direction of travel of the doughnuts along the way to its foremost position.

ALEXANDER S. T. LAGAARD.